US009911054B2

(12) United States Patent
Lee et al.

(10) Patent No.: US 9,911,054 B2
(45) Date of Patent: Mar. 6, 2018

(54) FOLDABLE DISPLAY DEVICE DISPLAYING STORED IMAGE BY FOLDING OR UNFOLDING ACTION AND METHOD OF THEREFOR

(71) Applicant: LG ELECTRONICS INC., Seoul (KR)

(72) Inventors: Doyoung Lee, Seoul (KR); Sinae Chun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 121 days.

(21) Appl. No.: 14/553,534

(22) Filed: Nov. 25, 2014

(65) Prior Publication Data

US 2016/0085325 A1  Mar. 24, 2016

(30) Foreign Application Priority Data

Sep. 22, 2014  (KR) .................. 10-2014-0125888

(51) Int. Cl.
| G06F 3/041 | (2006.01) |
| G06K 9/20 | (2006.01) |
| G06K 9/00 | (2006.01) |
| G06F 3/0488 | (2013.01) |
| G06F 1/16 | (2006.01) |

(52) U.S. Cl.
CPC ............ *G06K 9/209* (2013.01); *G06F 1/169* (2013.01); *G06F 1/1641* (2013.01); *G06F 1/1686* (2013.01); *G06F 3/0488* (2013.01); *G06K 9/00288* (2013.01); *G06K 9/00221* (2013.01)

(58) Field of Classification Search
CPC ...... G06F 1/169; G06F 1/1641; G06F 1/1686; G06F 3/0488; G06K 9/209; G06K 9/00288

See application file for complete search history.

(56) References Cited

U.S. PATENT DOCUMENTS 5,719,799 A * 2/1998 Isashi .................... G06F 1/1618
345/169
2011/0216224 A1  9/2011 Kim
2012/0026069 A1  2/2012 Ohsaki
2013/0321340 A1  12/2013 Seo et al.
(Continued)

FOREIGN PATENT DOCUMENTS

| KR | 10-2013-0024085 A | 3/2013 |
| WO | WO 2010/028402 A1 | 3/2010 |
| WO | WO 2010/114007 A1 | 10/2010 |

*Primary Examiner* — Ilana Spar
*Assistant Examiner* — Brent D Castiaux
(74) *Attorney, Agent, or Firm* — Birch, Stewart, Kolasch & Birch, LLP

(57) ABSTRACT

The present specification discloses a foldable display device displaying stored images by a folding or unfolding action of a foldable housing and a method of controlling therefor. The foldable display device according to the present specification includes a display unit including a first display area spatially or visually separated by the folding or unfolding action of the foldable housing. When the first display area changes a state from a state of facing a second direction (e.g., user direction) to a state of facing a first direction (e.g., third party direction), stored images are displayed on the first display area. By doing so, a third party can easily check the stored images displayed on the first display area.

14 Claims, 11 Drawing Sheets

(a)

(b)

(56) References Cited

U.S. PATENT DOCUMENTS

| | | | |
|---|---|---|---|
| 2014/0035942 A1* | 2/2014 | Yun | G09G 5/006 345/592 |
| 2014/0049464 A1* | 2/2014 | Kwak | G06F 3/0487 345/156 |
| 2014/0184628 A1* | 7/2014 | Lee | G06F 3/1423 345/545 |
| 2015/0145798 A1 | 5/2015 | Joo | |
| 2015/0264169 A1* | 9/2015 | Yim | H04M 1/72563 455/411 |

* cited by examiner

FIG. 1B
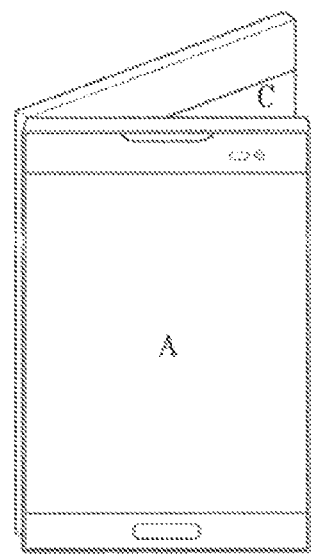
(a)
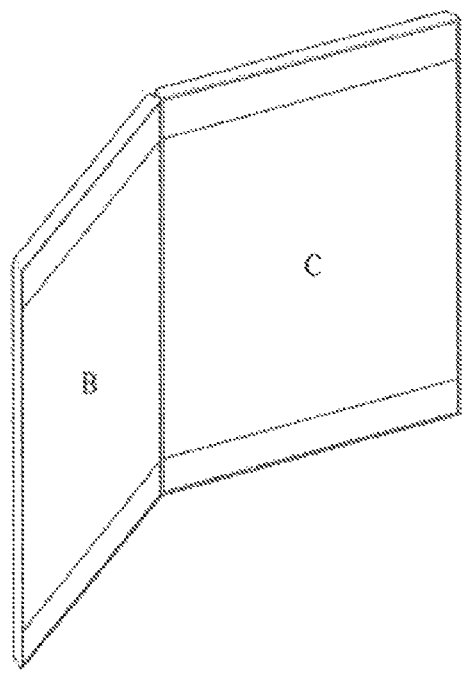
(b)

FIG. 1C
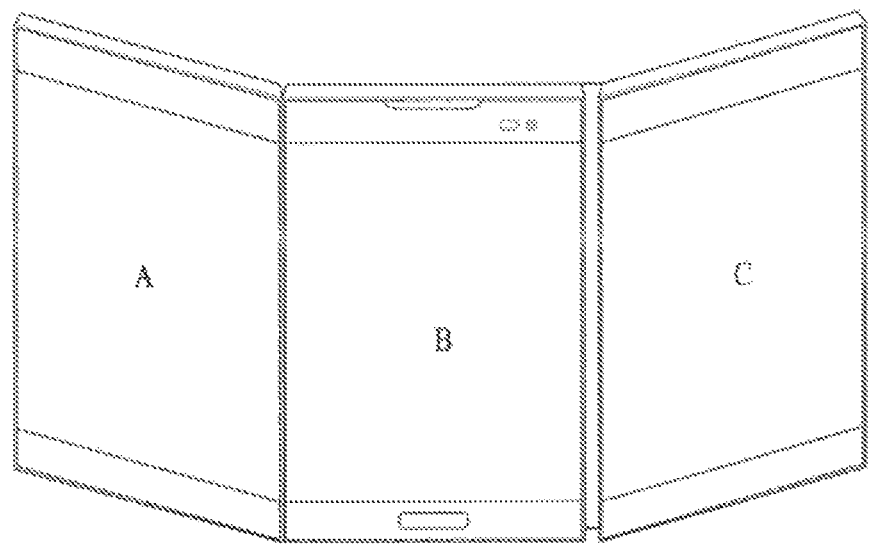
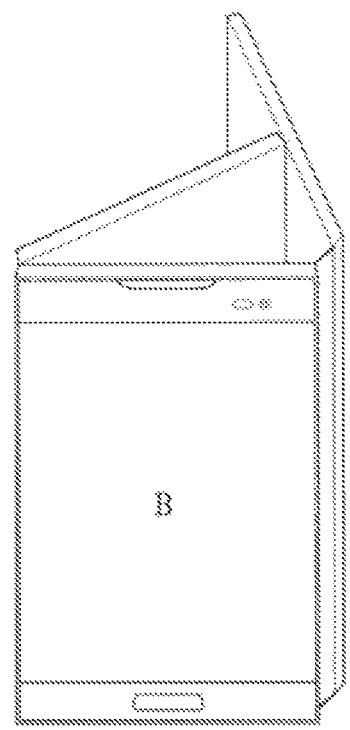

FIG. 1D
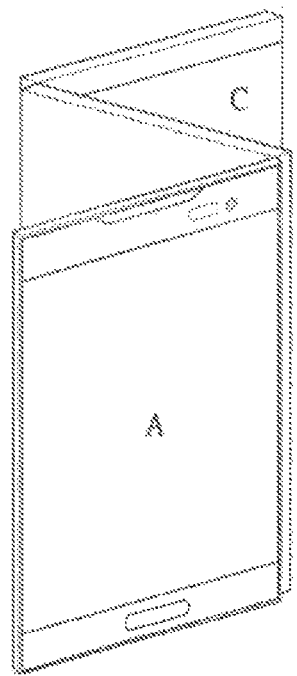
(a)
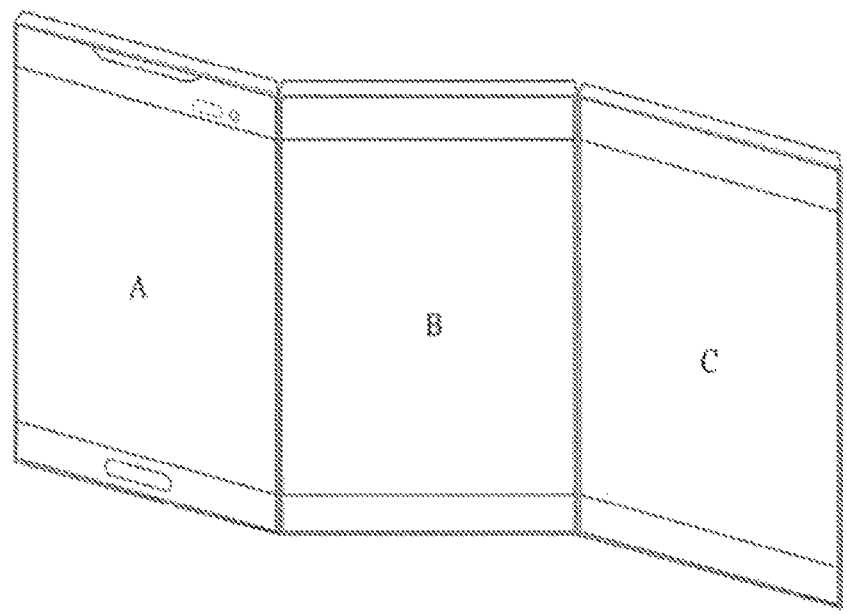
(b)

FIG. 1E
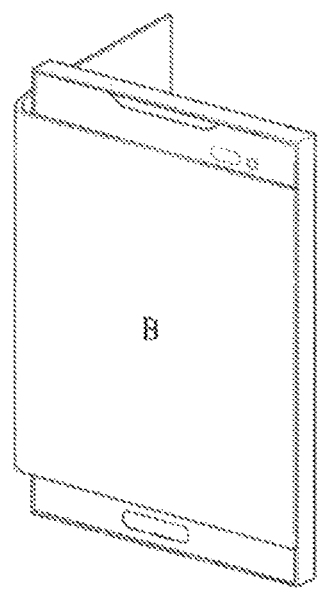
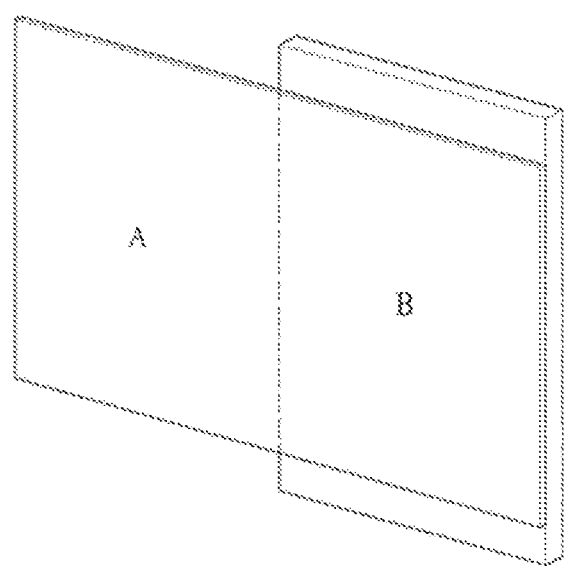

FIG. 5
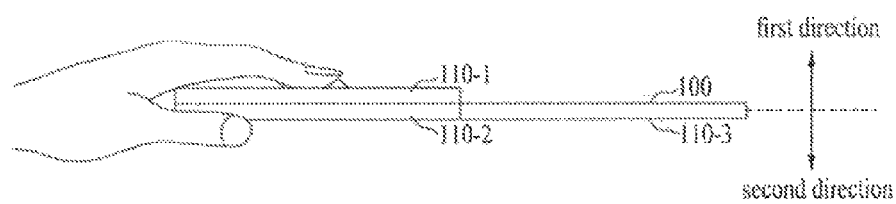
(a)
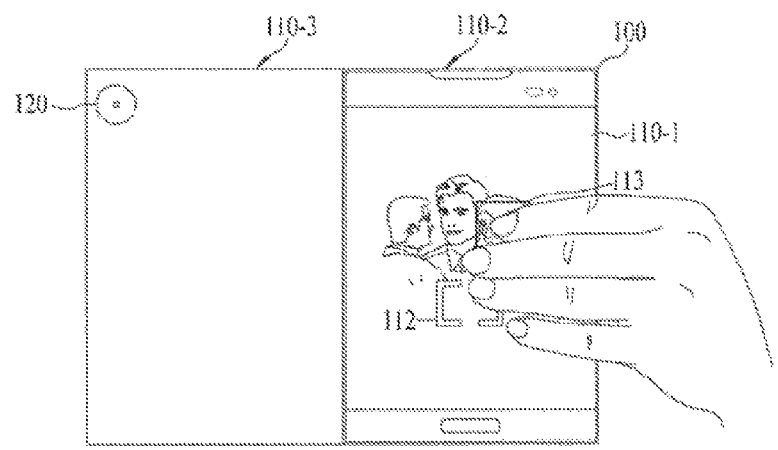
(b)

FIG. 6
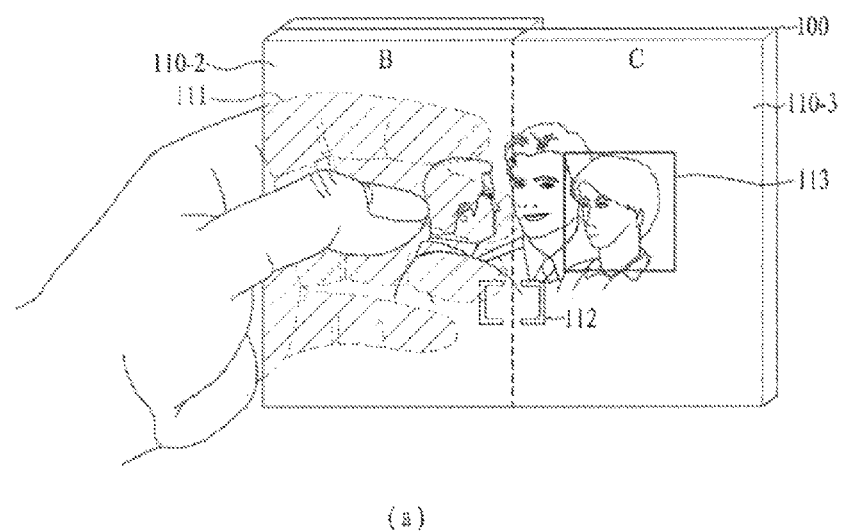
(a)
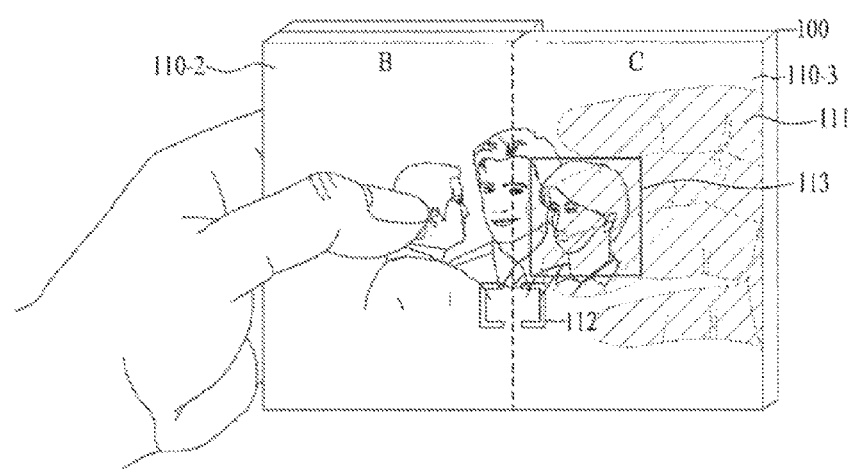
(b)

FOLDABLE DISPLAY DEVICE DISPLAYING STORED IMAGE BY FOLDING OR UNFOLDING ACTION AND METHOD OF THEREFOR

This application claims the benefit of the Korean Patent Application No. 10-2014-0125888, filed on Sep. 22, 2014, which is hereby incorporated by reference as if fully set forth herein.

BACKGROUND OF THE INVENTION

Field of the Invention

The present specification relates to a foldable display device and a method of controlling therefor, and more particularly, to a foldable display device displaying a stored image by a folding or unfolding action and a method of therefor.

Discussion of the Related Art

With technological advances, display devices of various forms are developing. In particular, in order to satisfy the need of a user who is eager to see an image on a bigger screen and increase mobility at the same time, a study on a foldable display including a plurality of displays in a foldable housing is actively conducting.

A user uses a device in a folded state to make a single display to be seen only or uses the device in an unfolded state to see a plurality of displays at a glance as necessary.

Meanwhile, since an action of folding or unfolding a housing including a display is feasible according to intention of a user, it is required to have a technology configured to apply according to the action of folding or unfolding of the user.

SUMMARY OF THE INVENTION

Accordingly, the present specification is directed to an apparatus and method thereof that substantially obviate one or more problems due to limitations and disadvantages of the related art. An object of the present specification is to provide a foldable display device displaying a stored image by a folding or unfolding action and a method of controlling therefor.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a foldable display device according to the present specification includes a foldable housing, a display unit configured to include a first display area spatially or visually separated by folding or unfolding action of the foldable housing and be positioned at one side of the foldable housing, a camera unit configured to capture a first direction in a manner of being positioned at the other side of the foldable housing, a storage unit configured to store a stationary image or a dynamic image captured by the camera unit, a sensor unit configured to output a signal on a direction at which the first display is facing by the folding or the unfolding action of the foldable housing and a control unit configured to determine the direction at which the first display area is facing in a manner of receiving the signal from the sensor unit, wherein when it is determined that the first display area has changed from a state of facing a second direction, the second direction being opposite to the first direction, to a state of facing the first direction, the control unit is configured to display images stored in the storage unit on the first display area.

According to one embodiment of the present specification, the control unit can determine the direction at which the first display area is facing in a manner of receiving the signal from the sensor unit while an application using the camera unit is operating.

According to one embodiment of the present specification, the control unit can display the images stored in the storage unit from a most recently stored image in a reverse order of time of storing the images stored in the storage unit on the first display area. In this case, the control unit can display the images on the first display area using a slide show scheme.

According to one embodiment of the present specification, the control unit can recognize a face in an image captured by the camera unit in real time, select an image including a face corresponding to the recognized face from the images stored in the storage unit and display the selected image on the first display area. In this case, the control unit can display an expanded image of the face corresponding to the recognized face in the selected image on the first display area.

According to one embodiment of the present specification, the control unit can display an image captured by the camera unit in real time on a second display area, the second display area being a display area excluding the first display area in the display unit.

According to a different embodiment of the present specification, the control unit can display an image identical to an image displayed on the first display area on a second display area, the second display area being a display area excluding the first display area in the display unit.

The display unit according to the present specification may correspond to a touch screen including a touch sensor. In this case, the control unit can receive information on a touched area among the first display area from the touch sensor situating at the first display area and further display a graphic user interface associated with the touched area on the second display area. In this case, the graphic user interface may correspond to a blurred image including a shape corresponding to the touched area.

According to one embodiment of the present specification, the control unit can display a graphic user interface of which the left position and the right position are changed for the touched area on the second display area.

According to a different embodiment of the present specification, the control unit can display the graphic user interface on the second display area in response to a ratio of the touched area occupying the first display area.

According to one embodiment of the present specification, the control unit can display the graphic user interface on the second display area when the touched area is adjacent to a focus displayed on the first display area.

According to a different embodiment of the present specification, the control unit can recognize a face in an image captured by the camera unit in real time, determine whether a face image corresponding to the recognized face is included in an image displayed on the first display area and if the touched area is adjacent to the face image corresponding to the recognized face among the image displayed on the first display area, display the graphic user interface on the second display area.

According to one embodiment of the present specification, when it is determined that the first display area has changed from the state of facing the first direction to the state of facing the second direction, the control unit stops displaying the images stored in the storage unit on the first display area and is able to display an image captured by the camera unit in real time on the display unit. And, when it is determined as the first display area has changed a state from the state of facing the second direction to the state of facing the first direction within a predetermined time, the control unit can display an image not displayed on the first display area among the images stored in the storage unit on the first display area.

According to a different embodiment of the present specification, when a predetermined input signal of a user is received, the control unit stops displaying the images stored in the storage unit on the first display area and is able to display an image captured by the camera unit in real time on the first display area.

The display unit according to the present specification may correspond to a touch screen including a touch sensor. In this case, the control unit can receive information on a touched area among the first display area from the touch sensor contained in the first display area and display a graphic user interface associated with the touched area on a second display area, the second display area being a display area excluding the first display area in the display unit. In this case, the graphic user interface may correspond to a blurred image including a shape corresponding to the touched area.

To further achieve these objects and other advantages and in accordance with the purpose of the invention, as embodied and broadly described herein, a method of controlling a foldable display device including a foldable housing, a display unit positioned at one side of the foldable housing and a camera unit configured to capture a first direction in a manner of being positioned at the other side of the foldable housing includes the steps of (a) receiving a signal from a sensor unit configured to output the signal on a direction at which a first display area spatially or visually separated by folding or unfolding action of the foldable housing among the display unit is facing, (b) determining whether the first display area changes a state from a state of facing a direction opposite to the first direction to a state of facing the first direction and (c) when the first display area changes the state to the state of facing the first direction, displaying images stored in a storage unit configured to store a stationary image or a dynamic image captured by the camera unit on the first display area.

According to one aspect of the present specification, it is able to show a stored image to a third party by a simple operation of a user.

According to a different aspect of the present specification, it is able to check or capture a figure of a third party looking at a stored image in real time.

According to a further different aspect of the present specification, a user can see an image identical to a stored image currently watched by a third party at the same time.

According to a further different aspect of the present specification, a user is able to know whether an image currently watched by a third party is blocked by a hand of the user. And, the user is able to know a blocked area.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate preferred embodiment(s) of the invention and together with the description serve to explain the principle of the invention. The present specification may be non-limited to the contents written on the drawings. In the drawings:

FIGS. 1A-1E are diagrams for an example of a foldable display device according to various embodiments of the present specification;

FIG. 5 is a diagram for a plane figure and a rear figure of a foldable display device according to one embodiment of the present specification;

FIG. 6 is a diagram for an example that a graphic user interface (GUI) is provided to a second display area;

DETAILED DESCRIPTION OF THE INVENTION

Reference will now be made in detail to the preferred embodiments of the present specification, examples of which are illustrated in the accompanying drawings. Wherever possible, the same reference numbers will be used throughout the drawings to refer to the same or like parts.

In the following, embodiments disclosed in the present specification are explained in detail with reference to attached drawings. In this case, composition and effect of the embodiments disclosed in the present specification are explained as at least one embodiment only. A technical idea, a core configuration and effect of the present specification may be non-limited by the composition and effect of the embodiments disclosed in the present specification.

A foldable display device according to the present specification can include a foldable housing and a display unit situating at one side of the foldable housing.

The foldable housing means a housing including a mechanical structure capable of being folded or unfolded by intention of a user. A position, a direction and the number of parts capable of being folded or unfolded may vary according to embodiment.

The display unit can be spatially or visually separated from each other by folding or unfolding of the foldable housing. In the following, a part of the display unit spatially or visually separated from each other by folding or unfolding of the foldable housing is called a 'first display area' in the present specification. And, a display area excluding the first display area in the display unit is called a 'second display area'. Meanwhile, the display unit may include two or more displays physically separated from each other or may include flexible displays capable of being spatially or visually divided into two or more parts by folding a single side.

FIGS. 1A-1E are diagrams for an example of a foldable display device according to various embodiments of the present specification.

Figure 1A:
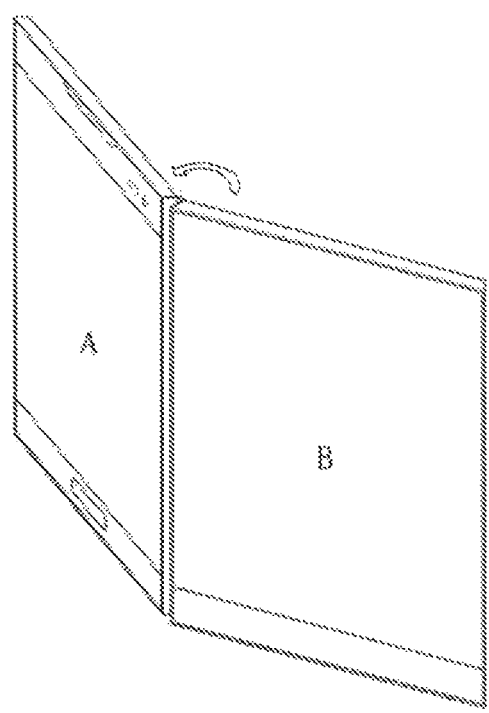

Referring to FIG. 1A, it shows a 2-foldable display device including a display unit consisting of 2 display areas (A and B) capable of being physically separated from each other. The two display areas (A and B) may face an identical direction or directions different from each other according to folding or unfolding of the foldable housing.

Referring to FIG. 1B, it shows a 2-foldable display device including a display unit consisting of 3 display areas (A, B and C) capable of being physically separated from each other. The display device has a structure showing one display area (A) only when the foldable housing is folded. And, the display device has a structure of which the two display areas (B and C) excluding the display area (A) in the display unit are seen like a single display when the foldable housing is unfolded.

Referring to FIG. 1C, it shows a 3-foldable display device including a display unit consisting of 3 display areas (A, B and C) capable of being physically separated from each other. It is able to check that the display device has a structure of which the 3 display areas (A, B and C) make one big display when the foldable housing is completely unfolded.

Referring to FIG. 1D, it shows a Z-shape 3-foldable display device including a display unit consisting of 3 display areas (A, B and C) capable of being physically separated from each other. It is able to check that the display device has a structure of the 3 display areas (A, B and C) capable of being folded and unfolded in 'Z' form by folding and unfolding of the foldable housing.

Referring to FIG. 1E, it shows a foldable display device including a flexible display unit consisting of 2 display areas (A and B) capable of being visually separated from each other. It is able to check that the display device has a structure that the flexible display unit is folded or unfolded together with folding or unfolding of the foldable housing.

As shown in FIG. 1A to FIG. 1E, the foldable display device according to the present specification may have embodiments of various types according to a mechanical structure of the foldable housing and a characteristic of the display unit. Hence, a scope of the present specification may be non-limited by examples of types of the foldable display device shown in the drawings. In particular, it is appropriate to comprehend as a device including a foldable housing of a mechanical structure capable of being folded or unfolded and a display unit situating at one side of the foldable housing corresponds to the foldable display device according to the present specification. Yet, for clarity, the present specification is explained in a manner of mainly concerning the Z-shape 3-foldable display device including 3 display areas (A, B and C) shown in FIG. 1D in the following description.

Meanwhile, the foldable display device according to the present specification means a device of various forms capable of processing various digital data and performing operations in response to the various digital data. The display device may correspond to one selected from the group consisting of a mobile communication device, a notebook computer, a personal computer, a tablet computing device, a portable navigation device, a portable video player, a PDA (personal digital assistant) and other similar device.

Figure 2:
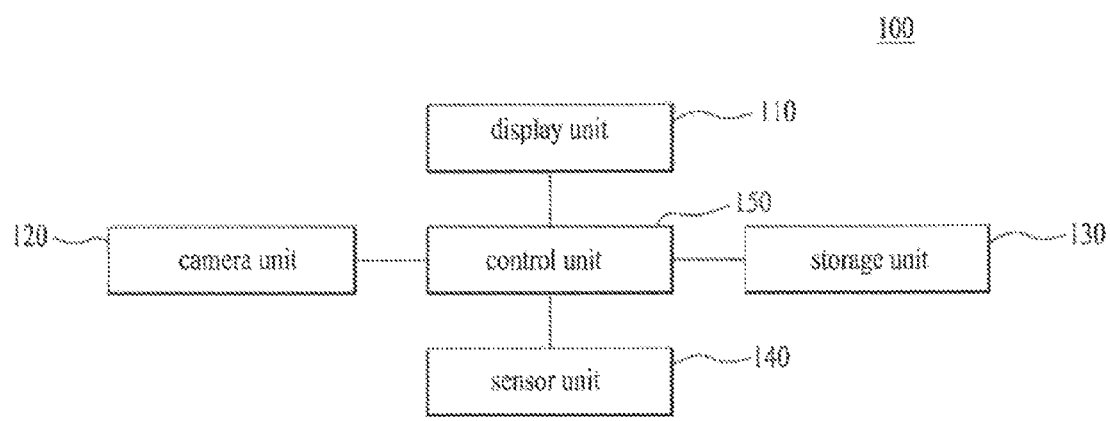
FIG. 2 is a schematic block diagram for a configuration of a foldable display device according to the present specification.

FIG. 2 is a schematic block diagram for a configuration of a foldable display device according to the present specification.

Referring to FIG. 2, the foldable display device 100 according to the present specification includes a display unit 110, a camera unit 120, a storage unit 130, a sensor unit 140 and a control unit 150.

The display unit 110 can output an image on a display screen. The display unit 110 outputs content executed by the control unit 150 or an image based on a control command of the control unit 150.

The camera unit 120 captures a surrounding environment image of the foldable display device 100 and converts the image into an electrical signal. To this end, the camera unit 120 can include an image sensor capable of converting an optical signal into an electrical signal. The image, which is captured by the camera unit 120 and converted into an electrical signal, is stored in the storage unit 130 and may be then able to be outputted on the display unit 110. Or, the image can be directly outputted on the display unit 110 without being stored in the storage unit. An image captured by the camera unit 120 may correspond to a stationary image (still image) or a dynamic image (video).

The camera unit 120 is positioned at the other side of the foldable housing. In the present specification, a direction at which the camera unit 120 is capturing is called a 'first direction'.

Meanwhile, the display unit 110 according to the present specification is positioned at one side of the foldable housing. Hence, a direction at which the display unit 110 is facing by folding or unfolding of the foldable housing may correspond to a direction identical to the first direction or a direction opposite to the first direction (hereinafter 'second direction').

The storage unit 130 can store a stationary image or a dynamic image captured by the camera unit 120. And, the storage unit 130 may store an application (or program) used for an operation of the control unit 150 or such various contents as audio, a picture, a video, an application and the like. The storage unit 130 may correspond to a RAM (random access memory), an SRAM (static random access memory), a ROM (read only memory), an EEPROM (electrically erasable programmable read only memory), a PROM (programmable read only memory) and the like.

The storage unit 130 may further include an external storing media capable of being attached/detached to/from the foldable display device 100. The external storing media may include such a slot form as a SD (secure digital) memory and a CF (compact flash) memory, a memory stick form, a USB (universal serial bus) form and the like. In particular, the external storing media may correspond to a storing media capable of being removed from the foldable display device 100 and providing content such as audio, a picture, a video, an application and the like to the foldable display device 100.

The sensor unit 140 can output a signal on a direction to which the first display area is facing by a folding or unfolding operation of the foldable housing. In order to output the signal, the sensor unit 140 may include a machine sensor and/or an electronic sensor.

The control unit 150 executes an application (or program) and can process internal data of the foldable display device. The control unit 150 can control the display unit 110, the camera unit 120, the storage unit 130 and the sensor unit 140. The control unit 150 can control data transmission and reception between the aforementioned units. In particular, the control unit 150 receives the signal from the sensor unit 140 while an application using the camera unit 120 is operating and may be then able to determine the direction at which the first display area is facing. The control unit 150 can include a processor, an ASIC (application-specific integrated circuit), a different chipset, a logical circuit, a register, a communication modem, a data processing device and the like well-known to a technical field to which the invention belongs thereto to execute various logics. And, in case that a control logic explained in detail in the following is implemented by software, the control unit 150 can be implemented by a set of program modules. In this case, the program modules are stored in the storage unit 130 and can be executed by a processor.

When it is determined that the first display area has changed from a state of facing the second direction to a state of facing the first direction, the control unit 150 according to the present specification can display an image stored in the storage unit 130 on the first display area. Regarding control logic of the control unit 150, it shall be explained in detail with reference to FIG. 3 to FIG. 6 in the following.

Figure 3:
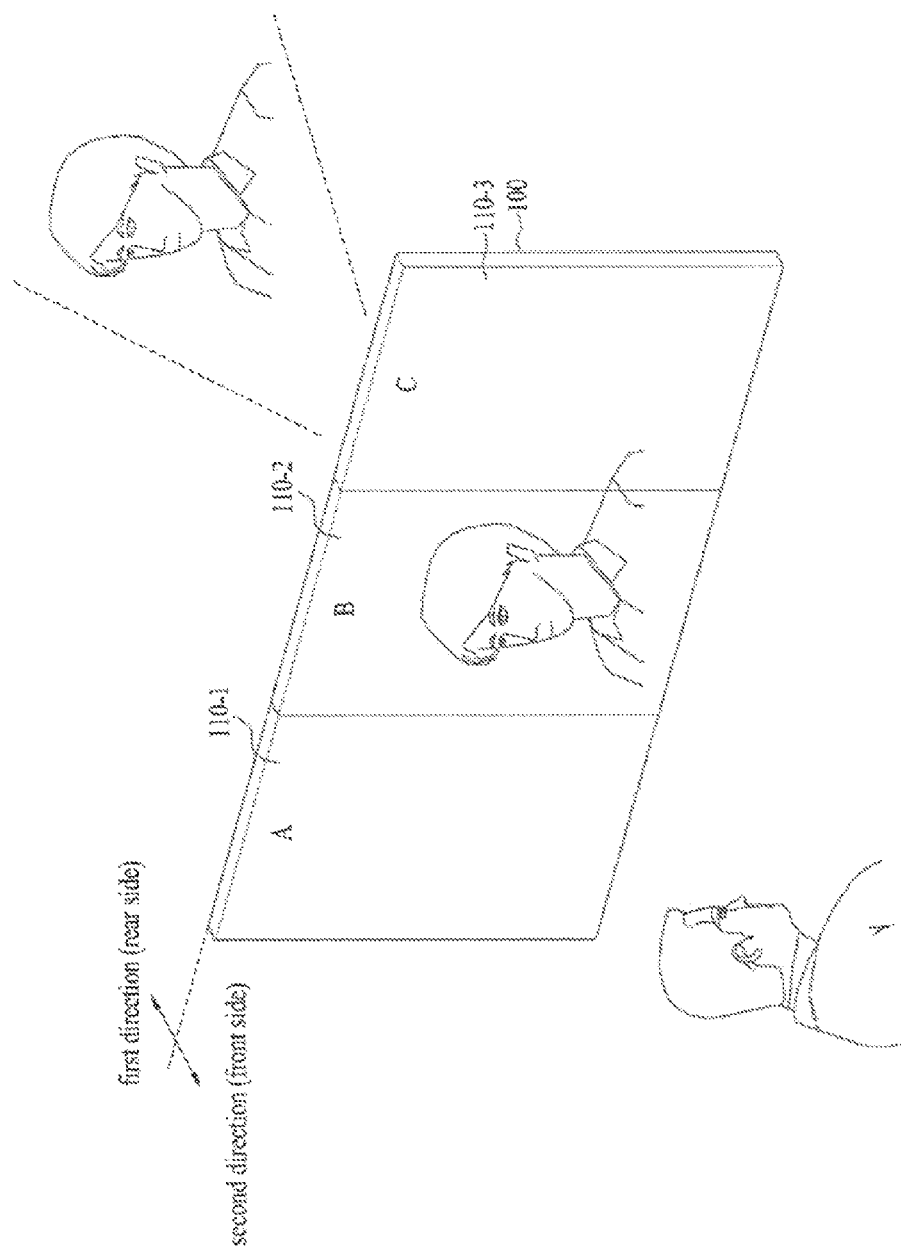
FIG. 3 is a diagram for an example of a usage of a foldable display device according to one embodiment of the present specification.

FIG. 3 is a diagram for an example of a usage of a foldable display device according to one embodiment of the present specification.

Referring to FIG. 3, it shows a foldable display device 100 according to one embodiment of the present specification. As mentioned in the foregoing description, the present specification is explained in a manner of mainly concerning the Z-shape 3-foldable display device including 3 display areas (A, B and C) shown in FIG. 1D in the following description, by which the present specification may be non-limited.

Assume a situation that the foldable display device 100 shown in FIG. 3 drives an application, which is using the camera unit 120. Referring to FIG. 3, it is able to check that all 3 display areas 110-1/110-2110-3 are unfolded to face a second direction. The camera unit 120 situating at the other side of the foldable display device 100 captures an image of surrounding environment positioned at the first direction and converts the image into an electrical signal. The control unit 150 can display the image captured by the camera unit 120 in real time on a part or all of the 3 display areas 110-1/110-2/110-3. The control unit 150 can store the real time image in the storage unit 130. An image stored in the storage unit 130 can be displayed on the display unit 110 by an input of a user. Hence, the user can check the real time image and the stored image via the display unit 110 according to intention of the user.

In the situation shown in FIG. 3, the user can check the real time image and the stored image as much as the user like. Meanwhile, not only the user but also a third party may want to check the stored image. For instance, the third party may want to check a figure of the third party captured by the camera unit 120 just a minute ago. In case of a legacy display device, the user used to control a stored image to be displayed on the display unit and then rotate the display device itself to make the display unit face the third party. Or, the third party used to approach the second direction to see the display unit. Yet, unlike the legacy display device, the foldable display device 100 according to the present specification can show the stored image to the third party with a more convenient and prompt user operation using a characteristic of the foldable housing.

Figure 4:
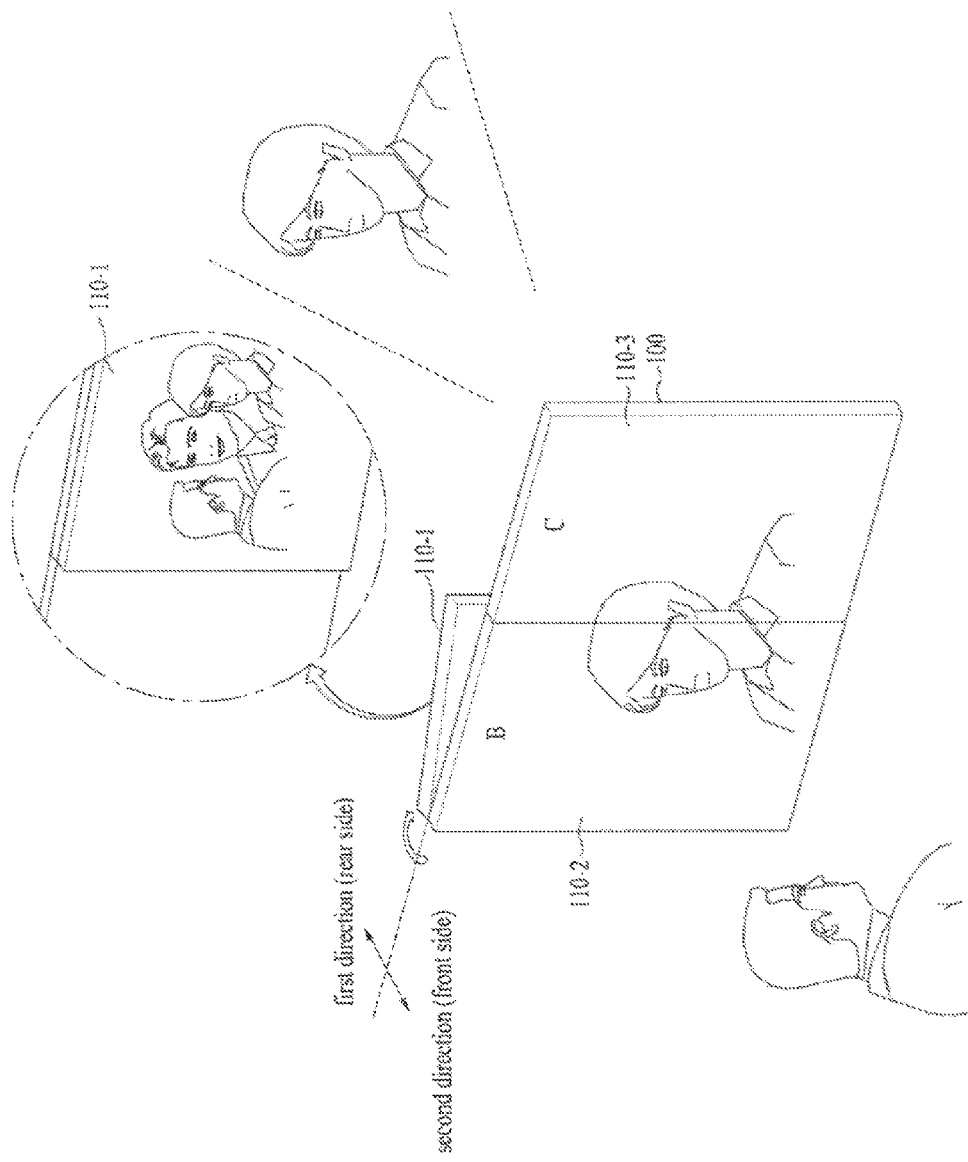
FIG. 4 is a diagram for an example of a usage to show a stored image to a third party using a foldable display device according to the present specification.

FIG. 4 is a diagram for an example of a usage to show a stored image to a third party using a foldable display device according to the present specification.

Referring to FIG. 4, it is able to check that a user has folded a display area 110-1 situating at the very left of a display unit 110 to make the display area 110-1 face a first direction. In the following, the display area 110-1 situating at the very left of the display unit is called a 'first display area' in the present specification. And, display areas 110-2/110-3 still facing a second direction are called a 'second display area' in the present specification.

In the present specification, the 'first display area' and the 'second display area' are terminologies used for distinguishing a display area changed to a state of facing the first direction from a state of facing the second direction from other display areas. The terminologies do not mean priority between the display areas. Moreover, as mentioned in the foregoing description, embodiment of the foldable display device 100 shown in FIG. 4 corresponds to a Z-shape 3-foldable display device. A display area capable of being folded from the state of facing the second direction to the state of facing the first direction corresponds to a display area 110-1 situating at the very left among the 3 display areas. Hence, the display area 110-1 situating at the very left of the display unit becomes the 'first display area'. The 'first display area' may have various positions and sizes according to a structure of the foldable housing or embodiment of the foldable display device.

Meanwhile, if the first display area 110-1 is folded by a user, the sensor unit 140 output a signal on a direction at which the first display area 110-1 is facing to the control unit 150. The control unit 150 receives the signal from the sensor unit 140 and may be then able to determine the direction at which the first display area 110-1 is facing.

According to embodiment of the present specification, the control unit 150 receives the signal from the sensor unit 140 while an application using the camera unit 120 is operating and may be then able to determine the direction at which the first display area 110-1 is facing. In other word, although the control unit 150 is always able to determine the direction at which the first display area 110-1 is facing by receiving the signal from the sensor unit 140, a control algorithm associated with displaying an image stored in the storage unit 130 on the first display area 110-1 may be performed only when the application using the camera unit 120 is operating.

In this case, when it is determined that the first display area 110-1 has changed a state from a state of facing the second direction to a state of facing the first direction, as shown in a partially expanded diagram, the control unit 150 can display an image stored in the storage unit 130 on the first display area 110-1. In particular, the control unit 150 can recognize an action of a user folding the first display area 110-1 to an opposite direction. And, the control unit 150 determines the active action of the user as an action to show the stored image to a third party located at the first direction. Hence, the control unit 150 displays the stored image on the first display area 110-1 facing the first direction.

Meanwhile, what a third party mostly wants to see may corresponds to a most recently captured image. Hence, the control unit 150 can display images stored in the storage unit 130 on the first display area 110-1 from a most recently stored image in a reverse order of time of storing the images stored in the storage unit 130.

Moreover, the control unit 150 can display the images on the first display area 110-1 using a slide show scheme. The 'slide show scheme' means to continuously show a plurality of images. Each of a plurality of the images is disappeared from the display unit after being displayed on the display unit for a predetermined time.

Meanwhile, according to one embodiment of the present specification, the control unit 150 can recognize a face in an image captured by the camera unit 120 in real time. And, the control unit 150 can select an image including a face corresponding to the recognized face from the stored images. The control unit 150 can display the selected image on the first display area 110-1. The aforementioned embodiment means to selectively provide images including the third party only via the first display area 110-1. Meanwhile, since a technology of recognizing a face in an image and a technology of determining whether there exist a face image corresponding to a recognized face in an image including a face correspond to well-known technologies at the moment on which the present specification is applied, detail explanation on the technologies is omitted.

Moreover, the control unit 150 can display an image of a face part corresponding to the recognized face in the selected image on the first display area 110-1 in a manner of expanding the face part. In general, attention of a person is more concentrated to a face part rather than other part included in an image including the face. Hence, according to the aforementioned embodiment, in order to enable a third party to see the face part more closely, a face part-expanded image is provided. Meanwhile, if the third party is apart from the foldable display device 100 for more than a prescribed distance or the third party has relatively poor sight, the face part-expanded image is provided to enable the third party to see the face part more closely. Provision of the face part-expanded image provided by the control unit 150 can be initiated by an input of a user.

According to one embodiment of the present specification, as shown in FIG. 4, while a stored image is displayed on the first display area 110-1, the control unit 150 can display an image captured by the camera unit 120 in real time on the second display area 110-2/110-3. In this case, the control unit 150 stores the real time image according to an input of a user and can capture a figure of a third party while the stored image is watched by the third party. By doing so, the foldable display device 100 according to the present specification can capture a response to the stored image of the third party.

According to a different embodiment of the present specification, the control unit 150 can display an image identical to an image displayed on the first display area 110-1 on the second display area 110-2/110-3. The embodiment corresponds to an embodiment enabling both a user and a third party to see a stored image at the same time.

Meanwhile, if the first display area 110-1 is blocked by a hand, the control unit 150 can provide information on the above situation to a user.

FIG. 5 is a diagram of a plane figure and a rear figure of a foldable display device according to one embodiment of the present specification.

Referring to FIG. 5(*a*), it shows a plane figure of the foldable display device 100 used according to one embodiment of the present specification. Since the first display area 110-1 is facing a first direction, the control unit 150 can display a stored image on the first display area 110-1. In this case, a hand of a user may block the first display area 110-1. In particular, as shown in FIG. 5(*b*), if the hand of the user blocks an important part of the stored image displayed on the first display area 110-1, it may be difficult to correctly show the stored image to a third party. Hence, it is necessary to provide the user with a fact that the hand of the user is blocking a part of the first display area 110-1 and information on an area blocked by the hand of the user. According to one embodiment of the present specification, the information can be delivered via a graphic user interface (GUI).

FIG. 6 is a diagram for an example that a graphic user interface (GUI) is provided to a second display area.

Referring to FIG. 6(*a*), it is able to check that a graphic user interface 111 capable of intuitively recognizing a position and a size of fingers of a user is displayed on the second display area 11-2/110-3.

Referring to FIG. 6(*b*), it is able to check that a graphic user interface 111 capable of recognizing a part, which is blocked by fingers of the user, of an image displayed on the first display area 110-1 is displayed on the second display area 110-2/110-3.

To this end, the first display area 110-1 may correspond to a touch screen including a touch sensor. Hence, if a part of the first display area 110-1 is blocked by the hand of the user, the touch sensor can detect a part and an area contacted with the hand of the user. The control unit 150 can receive information on the area of the first display area 110-1 contacted with the hand of the user from the touch sensor included in the first display area 110-1. The control unit 150 displays a graphic user interface 111 associated with the touched area on the second display area 110-2/110-3 and may be then able to provide the user with the information on the blocked part.

Meanwhile, as shown in FIG. 6, the graphic user interface 111 may correspond to a blurred image including a size and location associated with the touched area or an image of a different shape.

According to one embodiment of the present specification, as shown in FIG. 6(*a*), the graphic user interface can be displayed on the second display area in a manner that the left and the right of graphic user interface for the touched area are changed. In this case, the control unit 150 can display a graphic user interface of which the left and the right are changed for the touched area on the second display area.

According to a different embodiment of the present specification, as shown in FIG. 6(*b*), the graphic user interface 111 capable of recognizing a part of an image blocked by the hand of the user can be displayed on the second display area 110-2/110-3. In this case, the control unit 150 can display the graphic user interface in the second display area 110-2/110-3 in response to a ratio of the touched area occupying the first display area 110-1.

Meanwhile, among the image displayed on the first display area 110-1, if an important part of the image is blocked, it may be efficient to display the graphic user interface on the second display area 110-2/110-3.

According to one embodiment of the present specification, if the touched area is adjacent to a focus 112 of an image displayed on the first display area 110-1, the control unit 150 can display the graphic user interface 111 on the second display area 110-2/110-3. Images stored in the storage unit 130 correspond to images captured by the camera unit 120. Hence, each of the images may further include information on a focus 112 when it is captured by the camera unit 120. In an image, a part at which a focus is located is likely to be a part that a user or a third party wants to check. Hence, it may be efficient to display the graphic user interface 111 on the second display area 110-2/110-3 when an area touched by a hand of a user is adjacent to the focus. Meanwhile, the focus 112 shown in FIG. 5 and FIG. 6 is depicted to help understanding of the present specification. The focus may not be displayed on the display unit 110.

According to a different embodiment of the present specification, the control unit 150 can recognize a face in an image captured by the camera unit 120 in real time. The control unit 150 can determine whether a face image 113 corresponding to the recognized face is included in an image displayed on the first display area 110-1. When it is determined that the face image 113 corresponding to the recognized face is included in the image displayed on the first display area 110-1, the control unit 150 can determine whether the touched area is adjacent to the face image 113 corresponding to the recognized face among the image displayed on the first display area 110-1. When it is determined that the touched area is adjacent to the face image 113 corresponding to the recognized face among the image displayed on the first display area 110-1, the control unit 150 can display the graphic user interface 111 on the second display area 110-2/110-3. It is highly probable that a third party may want to check a face part of the third party. Hence, when an area touched by a hand of a user is adjacent to the face part of the third party, it may be efficient for the control unit 150 to display the graphic user interface 111 on the second display area 110-2/110-3. Meanwhile, a quadrangle for distinguishing face image 113 shown in FIG. 5 and FIG. 6 is depicted to help understanding of the present specification. The quadrangle may not be displayed on the display unit 110.

Meanwhile, after finishing a mode configured to show a stored image to a third party, a user may want to switch back to a mode of capturing an image using the camera unit 120.

According to one embodiment of the present specification, when it is determined that the first display area 110-1 has changed a state from a state of facing the first direction to a state of facing the second direction, the control unit 150 can stop displaying an image stored in the storage unit 130 on the first display area 110-1. And, the control unit 150 can display an image captured by the camera unit 120 in real time on the display unit 110. In particular, when it is assumed that a situation of FIG. 4 is changed to a situation of FIG. 3, it may be easier to understand. A user unfolds the first display area 110-1, which is initially folded to the first direction, to the second direction again. If an action, which is opposite to a previous action, of a user is detected, in other word, if an action returning to an original state is detected, the control unit 150 can determine the action as intention of the user trying to return to a previous mode.

Meanwhile, it may occur a situation that the situation of FIG. 3 is changed to the situation of FIG. 4 again and a direction at which the first display area 110-1 is facing is changed to the first direction again by an operation of a user. This situation may correspond to a situation that the user wants to show a stored image to a third party again. To this end, when it is determined that the first display area 110-1 has changed a state from the state of facing the second direction to the state of facing the first direction again within a predetermined time, the control unit 150 can display an image stored in the storage unit 130 on the first display area 110-1. The 'predetermined time' can be configured in various ways. In this case, the control unit 150 may display images not displayed on the first display area 110-1 on the first display area 110-1.

According to a different embodiment of the present specification, when a predetermined input signal of a user is received, the control unit 150 may stop displaying images stored in the storage unit 130 on the first display area 110-1. The 'predetermined input signal of the user' may correspond to a signal inputted via a hardware inputting device included in the foldable display device 100 or a signal inputted via a user interface displayed on the display unit 110. In this case, the control unit 150 can display an image captured by the camera unit 120 in real time on the first display area 110-1. In particular, when it is assumed that a real time image is displayed on the second display area 110-2/110-3 in the situation of FIG. 4, it may be easier to understand.

In the aforementioned embodiment, the control unit 150 can also display a real time image on the first display area 110-1. And, a part of the first display area 110-1 can be blocked by a hand of a user. Hence, it is necessary to provide the user with a fact that the hand of the user is blocking a part of the first display area 110-1 and information on the extent of blocking.

According to embodiment of the present specification, the display unit 110 may correspond to a touch screen including a touch sensor. And, the control unit 150 receives information on a touched area among the first display area 110-1 from the touch sensor included in the first display area 110-1 and can display a graphic user interface associated with the touched area on the second display area 110-2/110-3 among the display unit 110.

The graphic user interface may correspond to a blurred image including a shape corresponding to the touched area.

And, according to one embodiment, when the touched area is adjacent to a focus of an image captured by the camera unit 120 in real time, the control unit 150 can display the graphic user interface on the second display area 110-2/110-3. According to a different embodiment, the control unit 150 recognizes a face in the image captured by the camera unit 120 in real time. When the touched area is adjacent to a position of the recognized face of the image captured by the camera unit 120 in real time, the control unit 150 may display the graphic user interface on the second display area 110-2/110-3.

Since embodiment similar to the aforementioned embodiment has been explained in detail with reference to FIG. 5 and FIG. 6, duplicated explanation is omitted at this time. Yet, it may be able to comprehend as a real time image is displayed on the second display area 110-2/110-3.

In the following, a method of controlling a foldable display device according to the present specification is explained. Yet, since each component of the foldable display device is explained in detail in the foregoing description, duplicated explanation is omitted.

Figure 7:
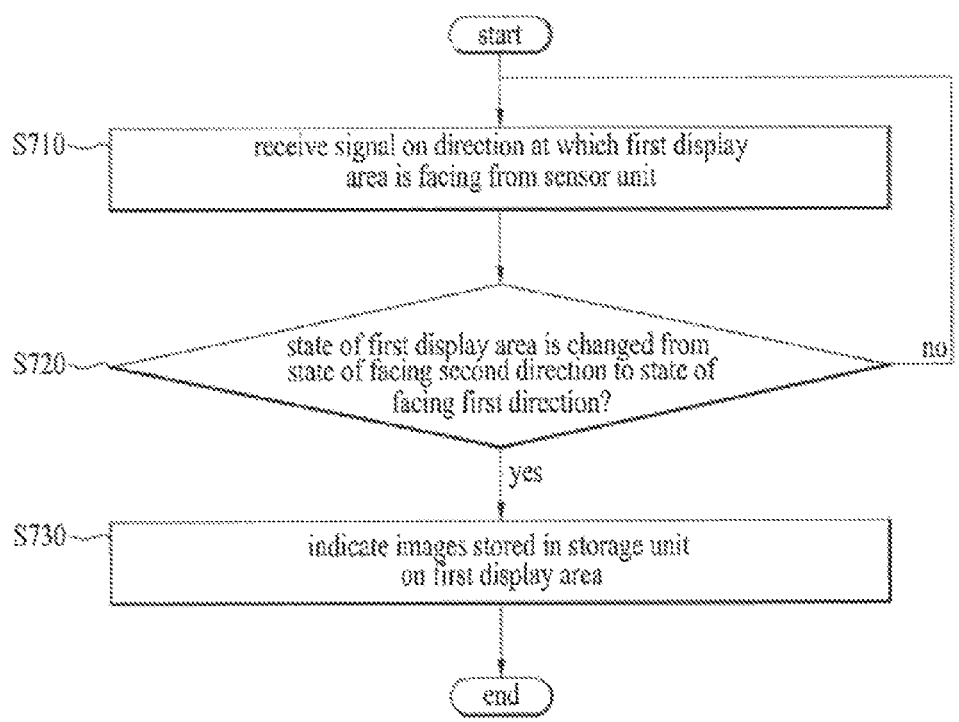
FIG. 7 is a flowchart for a method of controlling a foldable display device according to one embodiment of the present specification.

FIG. 7 is a flowchart for a method of controlling a foldable display device according to one embodiment of the present specification.

First of all, in the step S710, the control unit 150 receives a signal on a direction at which the first display area 110-1 is facing from the sensor unit 140. In the step S710, the control unit 150 stops processing and goes to the step S720.

In the step S720, the control unit 150 determines whether the first display area 110-1 changes a state from a state of facing a second direction to a state of facing a first direction. If the first display area 110-1 does not change the state from the state of facing the second direction to the state of facing the first direction ('No' in the step S720), the control unit 150 goes to the step S710. And, the control unit 150 repeatedly performs the step S710 and the step S720. On the contrary, if the first display area 110-1 changes the state from the state of facing the second direction to the state of facing the first direction ('Yes' in the step S720), the control unit goes to the step S730.

According to embodiment of the present specification, the control unit 150 can perform the step S720 only when an application using the camera unit 120 is operating.

In the step S730, the control unit 150 displays images stored in the storage unit 130 on the first display area 110-1.

According to embodiment of the present specification, in the step S730, the control unit 150 can display the images stored in the storage unit 130 from an image most recently stored in a reverse order of time of storing the images stored in the storage unit 130. Moreover, the control unit 150 can display the images on the first display area 110-1 using a slide show scheme.

According to embodiment of the present specification, in the step S730, the control unit 150 recognizes a face in an image captured by the camera unit 120 in real time, selects an image including a face corresponding to the recognized face from the images stored in the storage unit 130 and can display the selected image on the first display area 110-1. Moreover, the control unit 150 can display an image of which a face part corresponding to the recognized face in the selected image is expanded on the first display area 110-1.

Meanwhile, according to one embodiment of the present specification, in the step S730, the control unit 150 can display an image captured by the camera unit in real time on the second display area 110-2/110-3.

According to a different embodiment of the present specification, in the step S730, the control unit 150 can display an image identical to the image displayed on the first display area on the second display area 110-2/110-3.

Meanwhile, in the step S730, the control unit 150 can further display a graphic user interface displaying a fact that a hand of a user is blocking a part of the first display area 110-1 and information on the extent of blocking. Regarding the graphic user interface, since explanation on the graphic user interface is explained in detail with reference to FIG. 5 and FIG. 6, duplicated explanation is omitted.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

And, structural or functional descriptions specified for the embodiments disclosed in the present specification are described to explain the embodiments only. The embodiments can be implemented in various forms. It should not be comprehended as a scope of right is limited by the embodiments explained by the present specification.

Since various modifications can be performed on the embodiments according to a concept of the present specification and the embodiments may have various forms, examples of specific embodiment are shown in the drawings and the examples are explained in detail in the present specification. Yet, the embodiments according to the concept of the present specification may be non-limited by a specific disclosure form. Instead, it should be comprehended as all changes, substitutes and equivalents are included in an idea and a technical range of the present specification.

In this disclosure, when a prescribed part 'includes' a prescribed component, it means not to exclude a different component but to further include the different component unless there is a special opponent citation.

While the present specification has been described and illustrated herein with reference to the preferred embodiments thereof, it will be apparent to those skilled in the art that various modifications and variations can be made therein without departing from the spirit and scope of the invention. Thus, it is intended that the present specification covers the modifications and variations of this invention that come within the scope of the appended claims and their equivalents.

In explaining the embodiments of the present specification, although the embodiments are explained by mainly concerning an example that a dependent configuration is added by one only, it may also perform embodiments added in a manner that two or more dependent configurations are combined with each other. Hence, the scope of the present specification may not be limited by the embodiments disclosed in the present specification.

What is claimed is:

1. A foldable display device, comprising:
a foldable housing;
a display unit comprising a touch screen containing a touch sensor and configured to contain a first display area spatially or visually separated by a folding or unfolding action of the foldable housing and be positioned at one side of the foldable housing;
a camera unit configured to capture a first direction in a manner of being positioned at the other side of the foldable housing;
a storage unit configured to store a stationary image or a dynamic image captured by the camera unit;
a sensor unit configured to output a signal on a direction at which the first display is facing by the folding or the unfolding action of the foldable housing; and
a control unit configured to:
  determine the direction at which the first display area is facing in a manner of receiving the signal from the sensor unit,
  display images stored in the storage unit on the first display area when it is determined the first display area has changed a state from a state of facing a second direction opposite to the first direction, to a state of facing the first direction,
  display an image identical to an image displayed on the first display area on a second display area, the second display area being a display area excluding the first display area in the display unit,
  receive information on a touched area on the first display area from the touch sensor situated at the first display area, wherein the information includes a position and a size of fingers of a user, and further display a graphic user interface that includes the position and the size of the fingers of the user associated with the touched area, on the second display area, and
  display the graphic user interface on the second display area when the touched area is adjacent to a focus displayed on the first display area,
wherein each of the images includes focus information.

2. The foldable display device of claim 1, wherein the control unit is configured to determine the direction at which the first display area is facing in a manner of receiving the signal from the sensor unit while an application using the camera unit is operating.

3. The foldable display device of claim 1, wherein the control unit is configured to display the images stored in the storage unit from a most recently stored image in a reverse order of time of storing the images stored in the storage unit on the first display area.

4. The foldable display device of claim 3, wherein the control unit is configured to display the images on the first display area using a slide show scheme.

5. The foldable display device of claim 1, wherein the control unit is configured to display an image captured by the camera unit in real time on a second display area, the second display area being a display area excluding the first display area in the display unit.

6. The foldable display device of claim 1, wherein the graphic user interface corresponds to a blurred image containing a shape corresponding to the touched area.

7. The foldable display device of claim 1, wherein the control unit is configured to display a graphic user interface of which the left and the right are changed for the touched area on the second display area.

8. The foldable display device of claim 1, wherein the control unit is configured to display the graphic user interface on the second display area in response to a ratio of the touched area occupying the first display area.

9. The foldable display device of claim 1, wherein the control unit is configured to recognize a face in an image captured by the camera unit in real time, determine whether a face image corresponding to the recognized face is contained in an image displayed on the first display area and when the touched area is adjacent to the face image corresponding to the recognized face among the image displayed on the first display area, display the graphic user interface on the second display area.

10. The foldable display device of claim 1, wherein when it is determined as the first display area has changed a state from the state of facing the first direction to the state of facing the second direction, the control unit is configured to stop displaying the images stored in the storage unit on the first display area and display an image captured by the camera unit in real time on the display unit.

11. The foldable display device of claim 10, wherein when it is determined as the first display area has changed a state from the state of facing the second direction to the state of facing the first direction within a predetermined time, the control unit is configured to display an image not displayed on the first display area among the images stored in the storage unit on the first display area.

12. The foldable display device of claim 1, wherein when a predetermined input signal of a user is received, the control unit is configured to stop displaying the images stored in the storage unit on the first display area and display an image captured by the camera unit in real time on the first display area.

13. The foldable display device of claim 1, wherein the graphic user interface corresponds to a blurred image containing a shape corresponding to the touched area.

14. A method of controlling a foldable display device containing a foldable housing, a display unit positioned at one side of the foldable housing and a camera unit configured to capture a first direction in a manner of being positioned at the other side of the foldable housing, the method comprising:

receiving a signal from a sensor unit configured to output the signal on a direction at which a first display area spatially or visually separated by folding or unfolding action of the foldable housing among the display unit is facing;

determining whether the first display area changes a state from a state of facing a direction opposite to the first direction to a state of facing the first direction;

displaying images stored in a storage unit configured to store a stationary image or a dynamic image captured by the camera unit on the first display area, when the first display area changes the state to the state of facing the first direction;

displaying an image identical to an image displayed on the first display area on a second display area, the second display area being a display area excluding the first display area in the display unit;

receiving information on a touched area on the first display area, from a touch sensor situated at the first display area, wherein the information includes a position and a size of fingers of a user;

displaying a graphic user interface that includes the position and the size of fingers of the user and is associated with the touched area, on the second display area; and displaying the graphic user interface on the second display area when the touched area is adjacent to a focus displayed on the first display area, wherein each of the images includes focus information.

* * * * *